(12) United States Patent
Figge

(10) Patent No.: US 11,454,265 B2
(45) Date of Patent: Sep. 27, 2022

(54) TOLERANCE COMPENSATION ARRANGEMENT WITH SAFETY CLAMP

(71) Applicant: BÖLLHOFF VERBINDUNGSTECHNIK GmbH, Bielefeld (DE)

(72) Inventor: Hans-Ulrich Figge, Schloß Holte-Stukenbrock (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 293 days.

(21) Appl. No.: 16/771,792

(22) PCT Filed: Oct. 10, 2018

(86) PCT No.: PCT/EP2018/077632
§ 371 (c)(1),
(2) Date: Jun. 11, 2020

(87) PCT Pub. No.: WO2019/120665
PCT Pub. Date: Jun. 27, 2019

(65) Prior Publication Data
US 2020/0400173 A1    Dec. 24, 2020

(30) Foreign Application Priority Data

Dec. 19, 2017    (DE) .......................... 102017130605.6

(51) Int. Cl.
*F16B 5/02*    (2006.01)
(52) U.S. Cl.
CPC ............ *F16B 5/025* (2013.01); *F16B 5/0233* (2013.01)
(58) Field of Classification Search
CPC .............................. F16B 5/0233; F16B 5/025
See application file for complete search history.

(56) References Cited

U.S. PATENT DOCUMENTS

| 6,776,566 B2 | 8/2004 | Kobusch et al. |
| 7,891,927 B2 | 2/2011 | Burger et al. |

(Continued)

FOREIGN PATENT DOCUMENTS

| CN | 101135331 A | 3/2008 |
| CN | 101243260 A | 8/2008 |

(Continued)

OTHER PUBLICATIONS

DE202008011318U1 English translation (Year: 2008).*

(Continued)

*Primary Examiner* — Jason L Vaughan
*Assistant Examiner* — Amanda Kreiling
(74) *Attorney, Agent, or Firm* — Reising Ethington P.C.; Matthew J. Schmidt

(57) ABSTRACT

A tolerance compensation arrangement for fastening a first and second component, with automatic compensation of tolerances in the spacing between the components, has a base element with a first internal thread and a fastening structure for fastening the base element in an opening of the first component. The arrangement has an adjusting unit with a first external thread that forms a first thread pairing of a first thread direction with the first internal thread of the base element, and the adjusting unit has a fastening sleeve with a second internal thread. The arrangement has a dragging unit arranged at least partially in the adjusting unit. A fastening screw can be screwed into the second internal thread, and subsequently to the dragging unit. The adjusting unit can be co-rotated and brought into contact with the second component, and a press fit established between the adjusting unit and the base element.

15 Claims, 13 Drawing Sheets

(56) References Cited

U.S. PATENT DOCUMENTS

Figure 1:
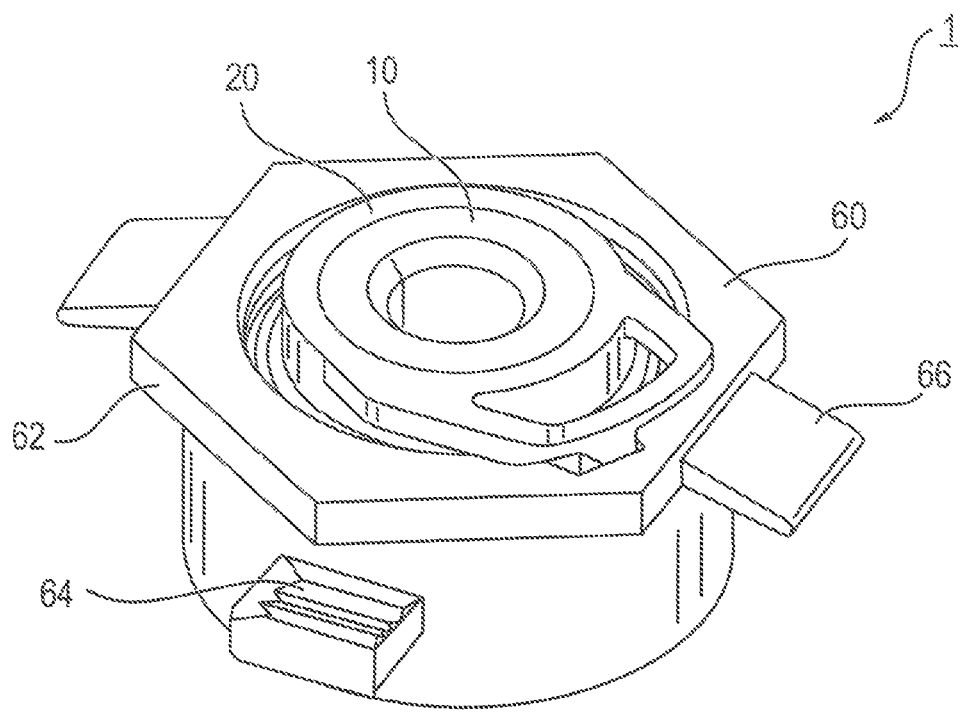

| | | |
|---|---|---|
| 8,066,465 B2 | 11/2011 | Figge et al. |
| 8,240,966 B2 | 8/2012 | Figge et al. |
| 8,506,224 B2 | 8/2013 | Cosenza et al. |
| 8,647,036 B2 | 2/2014 | Haylock et al. |
| 8,740,530 B2 | 6/2014 | Cosenza et al. |
| 8,827,585 B2 | 9/2014 | Figge et al. |
| 8,864,432 B2 | 10/2014 | Figge et al. |
| 9,829,020 B2 | 11/2017 | Ortega Dona |
| 2006/0280579 A1 | 12/2006 | Seidl et al. |

FOREIGN PATENT DOCUMENTS

| | | | |
|---|---|---|---|
| CN | 102138011 A | 7/2011 | |
| CN | 102287426 A | 12/2011 | |
| CN | 102654154 A | 9/2012 | |
| CN | 104981617 A | 10/2015 | |
| DE | 202005009017 U1 | 8/2005 | |
| DE | 202005016823 U1 | 2/2006 | |
| DE | 202007008152 U1 | 8/2007 | |
| DE | 202007008154 U1 | 9/2007 | |
| DE | 202008011318 U1 | 11/2008 | |
| DE | 202008011318 U1 * | 12/2008 | ............ F16B 37/042 |
| DE | 102013200689 A1 | 7/2014 | |
| EP | 1304489 A2 | 4/2003 | |
| EP | 2003346 A2 | 12/2008 | |
| EP | 2495453 A2 | 9/2012 | |
| JP | 5388290 B2 | 1/2014 | |

OTHER PUBLICATIONS

Written Opinion & International Search Report for PCT/EP2018/077632 dated Jan. 18, 2019, 15 pages.

English translation of the International Preliminary Report on Patentability for PCT/EP2018/077632 dated Jun. 23, 2020 (8 pages).

CN Office Action for CN Application No. 201880081999.3 dated Apr. 21, 2021 (9 pages).

* cited by examiner

TOLERANCE COMPENSATION ARRANGEMENT WITH SAFETY CLAMP

1. TECHNICAL FIELD

The present disclosure is related to a tolerance compensation arrangement for fastening a first component to a second component with automatic compensation of tolerances in the spacing between the first and the second component. Likewise, the present disclosure relates to a first component in combination with a tolerance compensation arrangement as well as to a first and a second component which are fixed to each other via a tolerance compensation arrangement by means of a fastening screw, a manufacturing method of a tolerance compensation arrangement as well as an assembly method of a tolerance compensation arrangement.

2. BACKGROUND

Tolerance compensation arrangements are known in a large variety. They usually consist of an adjusting bush or adjusting unit with a so-called dragging section or dragging element which can enter into a friction connection with a fastening screw. Therefore, when the fastening screw rotates, the adjusting bush is rotated as well until it abuts one of the two components, whereupon, when the fastening screw further rotates and the torque increases correspondingly, the friction connection is overcome so that then, the two components can be interlocked with each other through the fastening screw via the adjusting bush.

An example for a tolerance compensation arrangement is described in EP 1 304 489 A2. The tolerance compensation arrangement consists of a screw, a screw nut and an adjusting bush. The adjusting bush has a left-handed outer thread which can be screwed with a suitable left-handed inner thread of the screw nut, and a clamping portion which can be connected with the screw by frictional connection and which is rotatable relatively to the screw when the frictional connection is overcome so that the screw co-rotates the adjusting bush by friction connection during the screw-in process and thus screwing it out of the screw nut contrary to the insertion direction and, when the adjusting bush abuts the second component, enters into a screw connection for interlocking the two components by overcoming the friction connection with a right-handed inner thread of the screw nut or the adjusting bush.

Therefore, when using such a tolerance compensation arrangement, the fastening screws firstly engages with the clamping portion or dragging element before it subsequently engages with the inner thread of the attachment screw nut. Thus, in case of common automatic tolerance compensation systems, the adjusting thread, i.e. the thread pairing between the adjusting unit and the base element, is interlocked by tightening the fastening screw. In this connection, the thread flanks of the adjusting threads are pressed onto each other and the play between the inner thread and the outer thread is eliminated. As the adjusting threads generally have a fine ascent, they are secured against a detachment.

Furthermore, in current tolerance compensation arrangements, the adjusting bush or adjusting unit as well as the base element usually consist of plastic material. Therefore, the load which can be received by such a tolerance compensation arrangement is limited, particularly due to the material features of the used plastic material.

It is therefore the object of at least some implementations of the invention to provide an alternative construction of a tolerance compensation arrangement which, in view of the known state of the art regarding tolerance compensation arrangements, is optimized, particularly in view of the strengths which can be realized in this connection, while at the same time guaranteeing a broadest possible range of application.

3. SUMMARY

The above object is solved by a tolerance compensation arrangement for fastening a first component to a second component with an automatic compensation of tolerances in the spacing between the first and the second component, a first component in combination with a tolerance compensation arrangement, a first and a second component which are fastened to each other through the tolerance compensation arrangement by means of a fastening screw, a manufacturing method of a tolerance compensation arrangement as well as an assembly method of a tolerance compensation arrangement. Further embodiments and further developments result from the following description, the drawings as well as the appending claims.

The tolerance compensation arrangement for fastening a first component to a second component with an automatic compensation of tolerances in the spacing or distance between the first component and the second component comprises the following features: a base element with a first inner thread as well as a fastening structure at an outer side for fastening the base element in an opening of the first component, an adjusting unit with a first outer thread, with the first outer thread together with the first inner thread of the base element forming a first thread pairing of a first thread direction and the adjusting unit comprising an adjusting sleeve with a second inner thread adjacent to a first axial end, and a dragging unit which is arranged at least partially in the adjusting unit adjacent to a second axial end, while a fastening screw can firstly be screwed into the second inner thread of the fastening sleeve via a second thread pairing, by rotation in a second thread direction that is contrary to the first thread direction, and can subsequently be connected with the dragging unit through a releaseable dragging connection, so that when rotating the fastening screw, the adjusting unit can be co-rotated and moved in abutment with the second component and after that, a radial press fit between the adjusting unit and the base element can be generated.

The press fit between the adjusting unit and the base element may be achieved through the fastening screw alone.

In the following, the tolerance compensation arrangement is illustrated based on its application. In this connection, it is assumed that the tolerance compensation arrangement is already fastened in a first component. Such a fastening takes place via the fastening structure at the outer side of the base element. With regard to the design of the fastening structure, particular reference is made to EP 2 003 346 A2. The base element therefore comprises at least one radially protruding holding projection, so that the base element can be fastened through a form-fit and/or force-fit holding of the first component between the flange and the at least one holding projection at the first component. In particular, two opposite locking projections are arranged at the flange and two holding projections are axially spaced from the flange, which face each other, too. An offset between the holding projections and the locking projections may be 90°. Advantageously, the flange is arranged at the axial end of the base element, which faces the second component in the later use. Due to the at least one holding projection, the base element can be inserted into a key hole of the first component and can be fastened therein by means of rotation. Other fastening structures at the outer side of the base element may be preferred, such as for example a thread or something similar, in order to fasten the base element in the opening of the first component.

A second component may be arranged with a distance from the first component, with an opening in the second component being aligned with the opening of the first component. A fastening screw is guided through the opening in the second component for the purpose of fastening the second component and firstly engages with the fastening sleeve of the adjusting unit due to the construction of the tolerance compensation arrangement. The fastening sleeve which is arranged at the first axial end of the adjusting unit is therefore located at the end of the adjusting unit which faces the second component. Therefore, the fastening screw is first of all screwed into the fastening sleeve, which may be a screw nut with a flange. Only then does the fastening screw come into a frictional engagement with the dragging unit. The dragging unit which is arranged at the second axial end of the adjusting unit is therefore located at the end of the adjusting unit which faces away from the second component. In a further embodiment, the first axial end of the tolerance compensation arrangement with the fastening sleeve therefore faces away from the base element and the second axial end of the adjusting unit with the dragging unit faces towards the base element. The base element, the adjusting unit and the dragging unit may be separate elements or components.

The fastening screw together with the dragging unit forms a releaseable dragging connection so as to co-rotate the adjusting unit when rotating the fastening screw, thus moving the adjusting unit for the purpose of compensation of the tolerance in abutment with the second component. In this connection, it is particularly also the fastening sleeve which abuts the second component.

When further rotating the fastening screw, during which rotation the dragging connection is overcome by correspondingly increasing the torque, the dragging unit is radially pressed to the outside as the fastening screw is screwed into the dragging unit, thus causing a clamping, i.e. the radial press fit, between the outer thread of the adjusting unit and the inner thread of the base element.

Particularly due to this clamping between the outer thread of the adjusting unit and the inner thread of the base element, a relative movement is prevented in case of a corresponding play of the thread pairing, which would otherwise result in an undesired rattling. A play in the thread pairing between the adjusting unit and the base element is often desired, so that the dragging moment of the adjusting unit can be kept small, so that the force which later has an effect on the second component to be screwed on is as low as possible. Similarly, the clamping ensures that on the other hand, no play-free manufacturing of the thread pairing is necessary. A play-free manufacturing would have the disadvantage that a very high dragging moment may be necessary in order to be able to safely move out the adjusting unit. This leads to a very high axial load being applied on the second component to be screwed on so that a tolerance compensation arrangement with a play-free thread pairing between the adjusting unit and the base element can only be used in case of very stable steel constructions.

An advantage of the tolerance compensation arrangement is therefore that a smooth thread pairing between the adjusting unit and the base element with the corresponding play can be available without any rattling arising in use. Thus, a low dragging moment is sufficient in order to safely move out the adjusting unit. The axial load which is applied on the second component to be screwed on is therefore low, compared with other tolerance compensation arrangements, as is desired. The special thing about the present solution is furthermore that the play of the thread pairing between the adjusting unit and the base element is eliminated when further screwing in the fastening screw and that the adjusting thread is clamped against a loosening. Furthermore, the thread pairing out of adjusting unit and base element does not have to transfer the pre-tension force of the fastening screw.

In a further embodiment, the dragging unit comprises a plurality of dragging segments which are evenly spaced circumferentially and connected via connecting webs or webs. In this connection, the dragging unit may comprise four fastening segments. Due to the dragging segments, which are connected via connecting webs with each other, a load, which may be necessary after the adjusting unit abuts the second component in order to overcome the torque, can be adjusted flexibly to the respective application case. Furthermore, the connecting webs guarantee that the dragging segments can move radially to the outside, thus pushing against the inner side of the adjusting unit, which in turn is pushed against the base element, which causes the corresponding clamping. It may therefore be particularly preferred when the connecting webs comprise a lower thickness than the dragging segments.

In a further embodiment, each dragging segment includes, at the radial inner side, a chamfer at an end facing towards the fastening sleeve. The chamfer is then the first component of the dragging unit which comes into engagement with the fastening sleeve. In this connection, the angle of the chamfer influences the load for overcoming the torque later on. In a further embodiment, the angle of the chamfer is an acute angle with reference to a longitudinal axis of the tolerance compensation arrangement, the angle particularly being selected from an angle range from 10° to 30°. It may furthermore be preferred that each dragging segment has a locking notch or a clamping web at the radial outer side, which interact with a first clearance or opening of the adjusting unit. The first opening of the adjusting unit runs radially and serves, on the one hand, for the engagement of the locking notch for the purpose of safely fastening the dragging unit in the adjusting unit. On the other hand, the opening, which is in particular a breakthrough, causes an improvement of the flexibility of the adjusting unit in the corresponding portion. Due to this, the clamping between the adjusting unit and the base element is further improved. It may particularly be preferred that the locking notch or the clamping web are in direct contact with the base element after screwing in the fastening screw. In this way, the clamping is further supported.

In a further embodiment, each dragging segment has a guiding web adjacent to the locking notches at the radially outer side, the guiding web interacting with a second opening of the adjusting unit. The second opening, which is in particular a breakthrough, causes an improvement of the flexibility of the adjusting unit in the corresponding portion, as does the first opening, already. However, contrary to the first opening, the second opening runs axially, not radially, i.e. parallel to the longitudinal axis of the adjusting unit. In this way, the clamping between the adjusting unit and the base element is further improved. Furthermore, the interaction between the guiding web and the second opening prevents a rotation of the dragging unit during insertion so that the correctly positioned assembly of the dragging unit in the adjusting unit is guaranteed. It is furthermore advantageous that the guiding web is configured with sharp edges and is in direct contact with the base element after the fastening screw is screwed in. In this way, the guiding web grips or locks within the inner thread of the base element, thus supporting the clamping.

In a further embodiment, the adjusting unit consists of a plastic material and the fastening sleeve of metal, with the fastening sleeve being overmolded by the material of the adjusting unit and a first axial end of the fastening sleeve being arranged flush with the first axial end of the adjusting unit. Thus, a screw connection with high strength, e.g. an 8.8 screwing, can be realized, although the thread pairing comprises at least partially of plastic material between the adjusting unit and the base element. It may therefore be preferred that the dragging unit and the base element consist of plastic material. This realizes a cost-efficient production of the corresponding components. Furthermore, the outer thread of the adjusting unit and the inner thread of the base element are defined threads as the components are made of plastic material, in particular by means of injection molding.

In a further embodiment, the adjusting unit comprises a structure which is adjacent to the first axial end, in particular a radially projecting structure at which a projection is arranged which projects in an axial direction into the direction of the second axial end of the adjusting unit which interacts with a recess in the base element, so that a counter lock and/or rotation lock is formed. The mechanisms of counter locks and/or rotation locks are known in connection with tolerance compensation arrangements. In particular, the adjusting unit and the base element are secured in this way during transportation, such, that the adjusting unit cannot further be screwed into the base element.

A first component is the combination with an embodiment of the above-described tolerance compensation arrangement with the tolerance compensation arrangement being screwed into the first component. For this purpose, the tolerance compensation arrangement comprises an outer thread at the base element. The first component in combination with the tolerance compensation arrangement comprises the above-described advantages of the tolerance compensation arrangement, so that reference is made to the corresponding explanations.

A first and a second component are fastened to each other via an embodiment of the above-mentioned tolerance compensation arrangement as well as by means of a fastening screw. The fastening screw may consist of metal, in particular of steel. In this way, and when the fastening sleeve is also made of metal, the thread pairing between the fastening screw and the fastening sleeve is a metal-metal connection. The components which are fastened to each other also have the above-mentioned advantages of the tolerance compensation arrangement, so that in this connection, too, reference is made to the corresponding explanations.

A manufacturing method of a tolerance compensation arrangement, in particular of a tolerance compensation arrangement, comprises the following steps: providing a base element with a first inner thread as well as a fastening structure at an outer side, providing an adjusting unit with a first outer thread, an attachment sleeve with a second inner thread being arranged adjacent to a first axial end of the adjusting unit as well as providing dragging unit arranged at least partially in the adjusting unit adjacent to a second axial end of the adjusting unit, subsequently, screwing the adjusting unit into the base element, with the first outer thread together with the first inner thread forming a first thread pairing of a first thread direction. With the tolerance compensation arrangement that is produced, the above-mentioned advantages of the tolerance compensation arrangement can be realized. In this regard, reference is again made to the corresponding explanations. Screwing the adjusting unit into the base element may be carried out such that when the counter lock and/or rotation lock is/are present, they can fulfil their function.

In a further embodiment, the step of providing the base element comprises an injection molding of the base element out of plastic material. In addition to that or as an alternative, the step of providing the adjusting unit comprises providing the attachment sleeve out of metal and overmolding the fastening sleeve with a plastic material for manufacturing the adjusting unit. Instead of overmolding, other methods may be preferred as well, such as for example gluing the fastening sleeve into the adjusting unit or shrinking or clamping. In this way, in case of a fastening screw out of metal, a metal-metal connection, that is more durable compared with plastic material, can be provided for the thread pairing out of fastening sleeve and fastening screw. Contrary to that, plastic material is used for the thread pairing of adjusting unit and base element, so that the threads are defined precisely.

In a further embodiment, the step of providing the adjusting unit comprises providing a dragging unit, in particular injection molding a dragging unit, and clipping the dragging unit into the adjusting unit. In this way, it is guaranteed that the adjusting unit, the base element and the dragging unit are separate components each. This increases the flexibility of the tolerance compensation arrangement as the materials used can be specifically selected depending on the respective application case.

An assembly method of a tolerance compensation arrangement, in particular of a tolerance compensation arrangement, comprises the steps: inserting the tolerance compensation arrangement into a first opening of a first component, with the tolerance compensation arrangement comprising a base element which includes a first inner thread as well as a fastening structure at an outer side for fastening the base element in an opening of the first component, an adjusting unit having a first outer thread, that is screwed into the base element, with the first outer thread together with the first inner thread of the base element forming a first thread pairing of a first thread direction and the adjusting unit having a fastening sleeve with a second inner thread adjacent to a first axial end, as well as a dragging unit that is arranged at least partially in the adjusting unit adjacent to a second axial end, arrangement of a second component in a spacing to the first component with a tolerance compensation arrangement inserted therein, inserting a fastening screw through an opening in the second component, with the fastening screw comprising a second outer thread which, together with the second inner thread of the fastening sleeve, forms a second thread pairing of a second thread direction opposite to the first thread direction, and screwing the fastening screw into the fastening sleeve by rotating the fastening screw in the second thread direction, subsequently, further rotating the fastening screw until there is a friction-type engagement of the fastening screw with the dragging unit, causing the adjusting unit to move from the base element into the direction of the second component until the adjusting unit, in particular the fastening sleeve, abuts the second component, and further rotating the fastening screw into the dragging unit, causing the dragging unit to clamp the adjusting unit in the base element. Thus, a connection between two components by means of a tolerance compensation arrangement can be caused with the assembly method. With regard to the advantages, reference is made to the corresponding explanations above, in order to avoid unnecessary repetitions.

4. BRIEF DESCRIPTION OF THE ACCOMPANYING DRAWINGS

Figure 2:
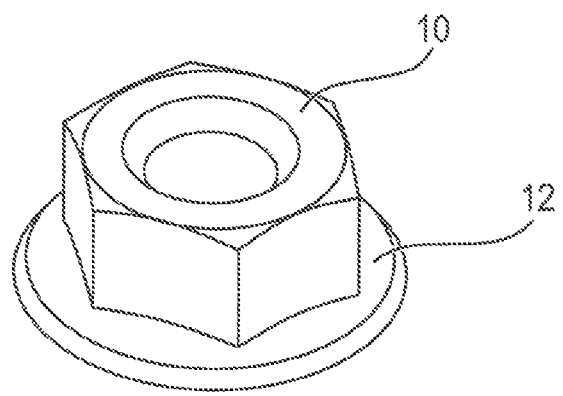
Figure 3:
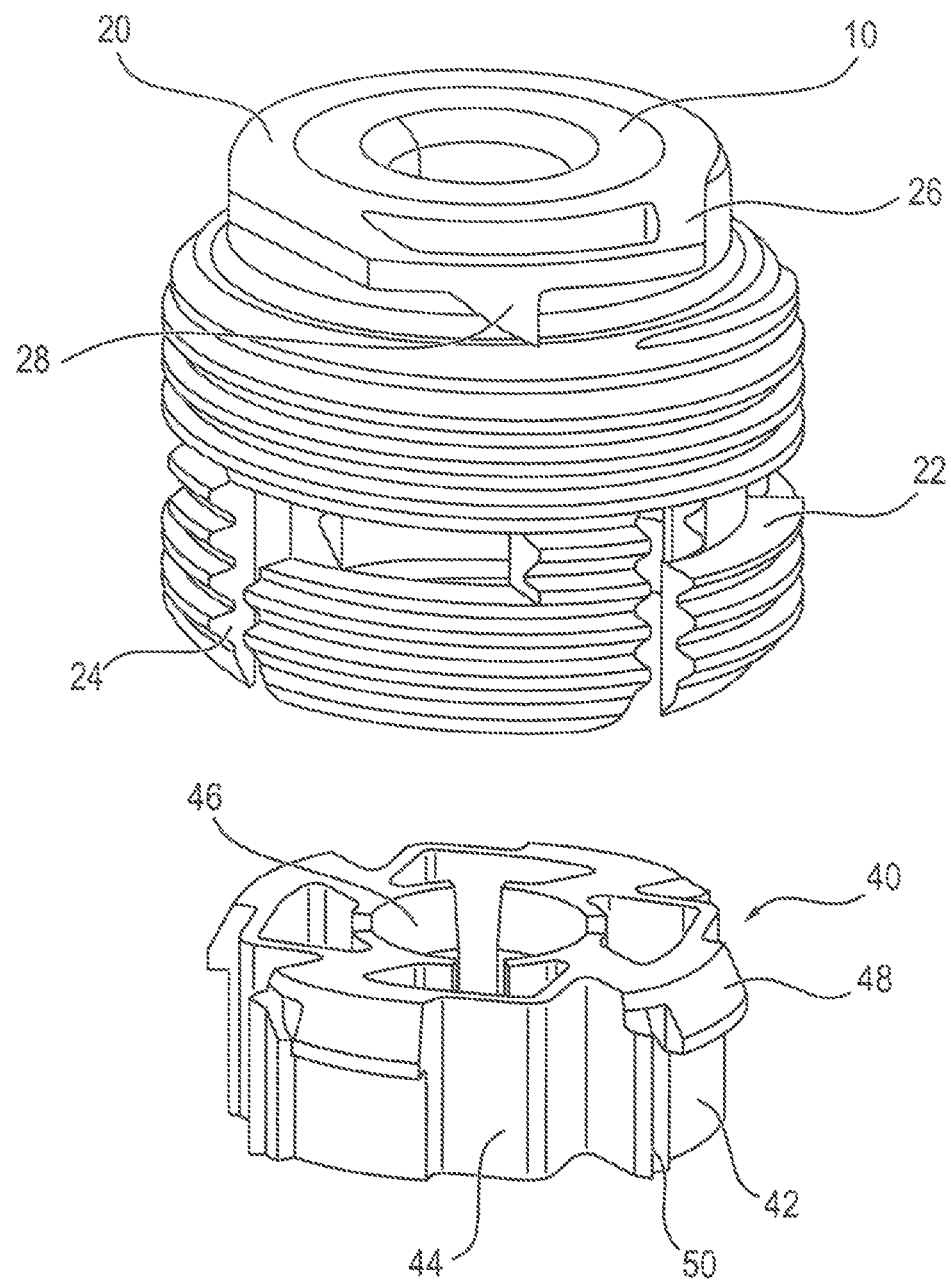
Figure 4:
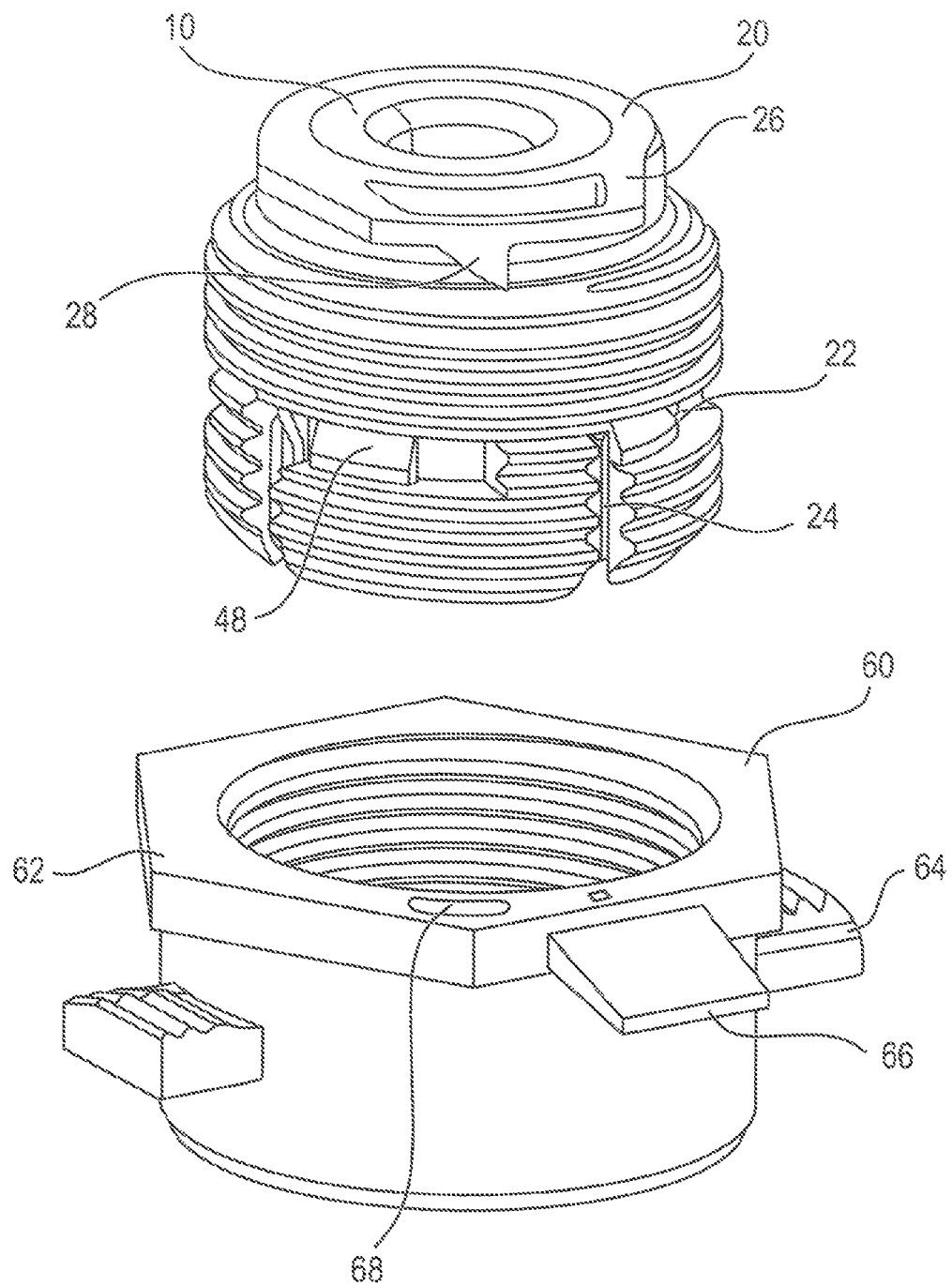
Figure 5:
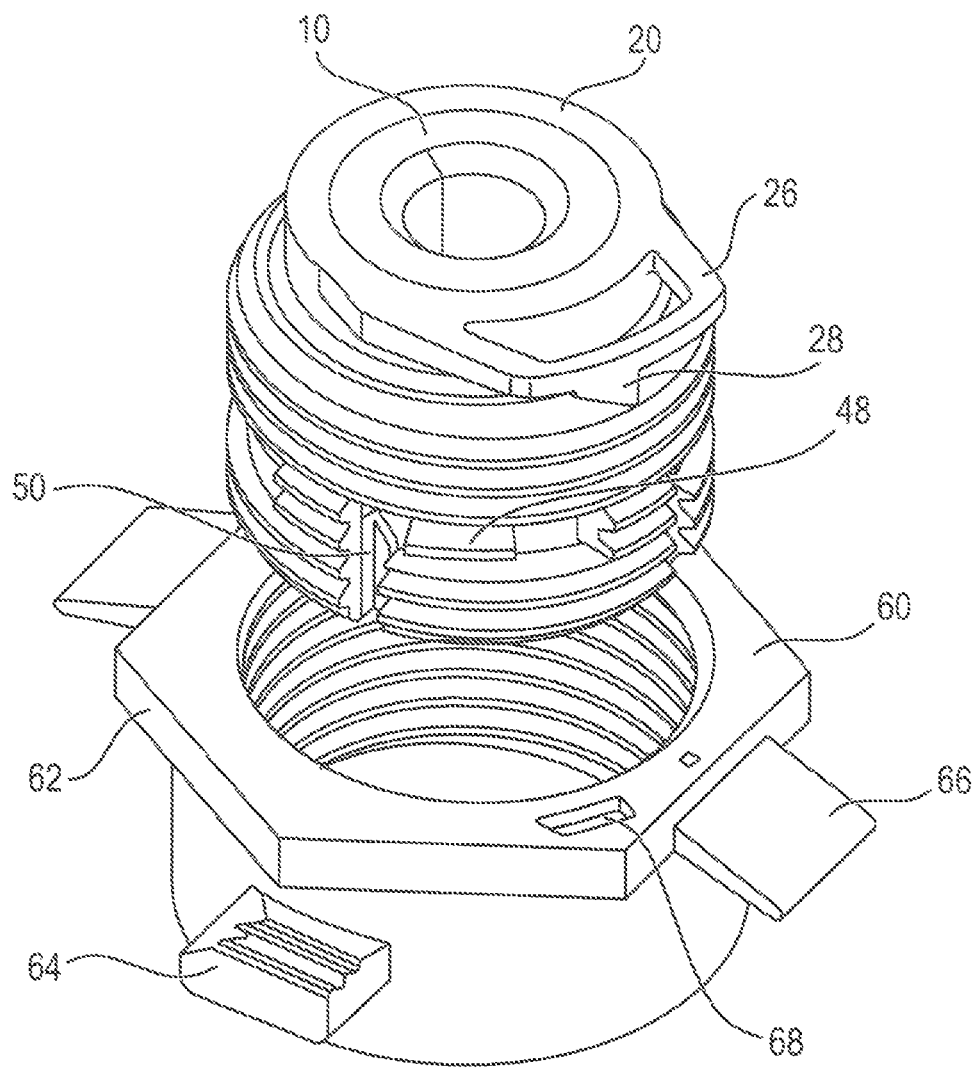
Figure 6:
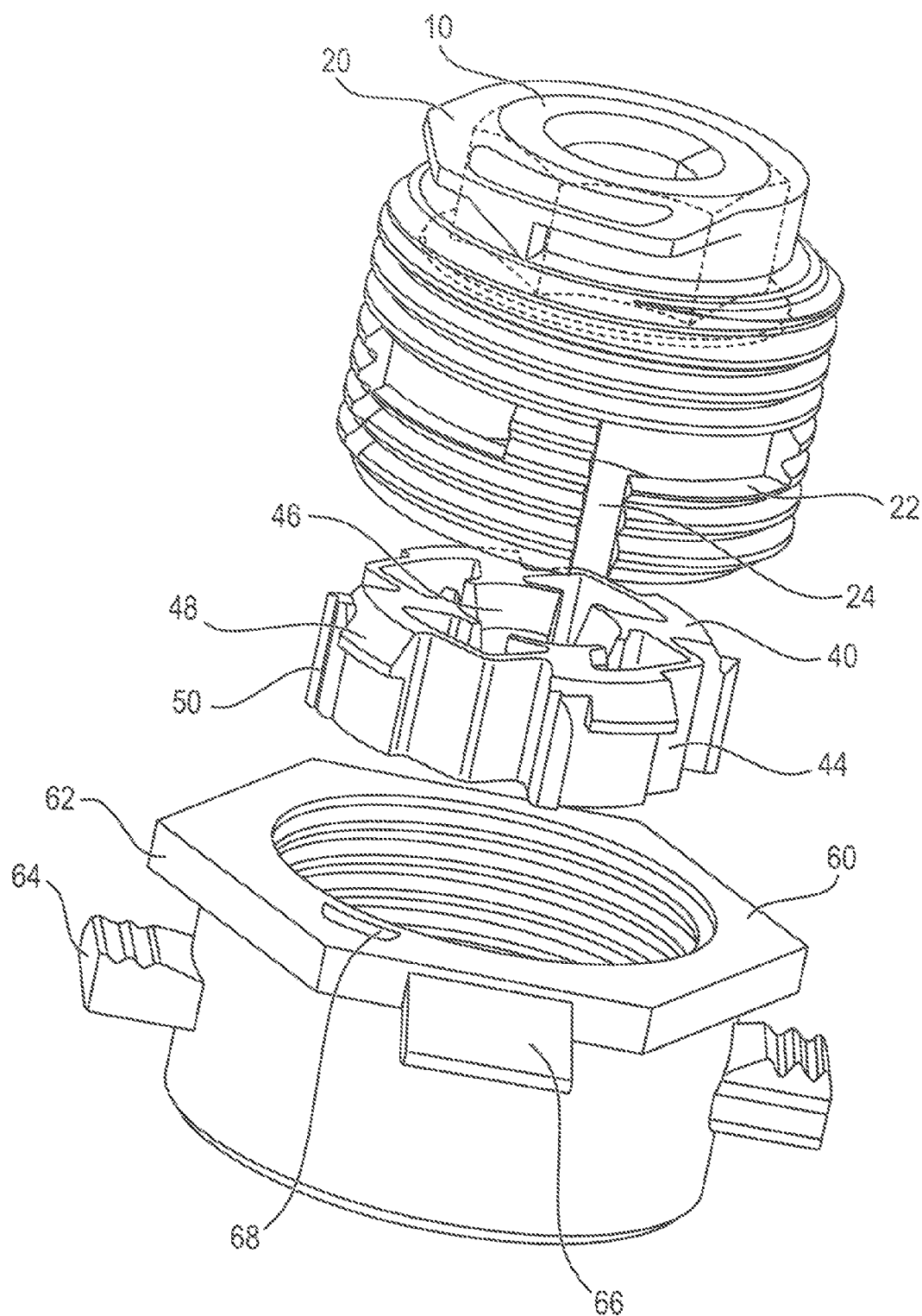
Figure 7:
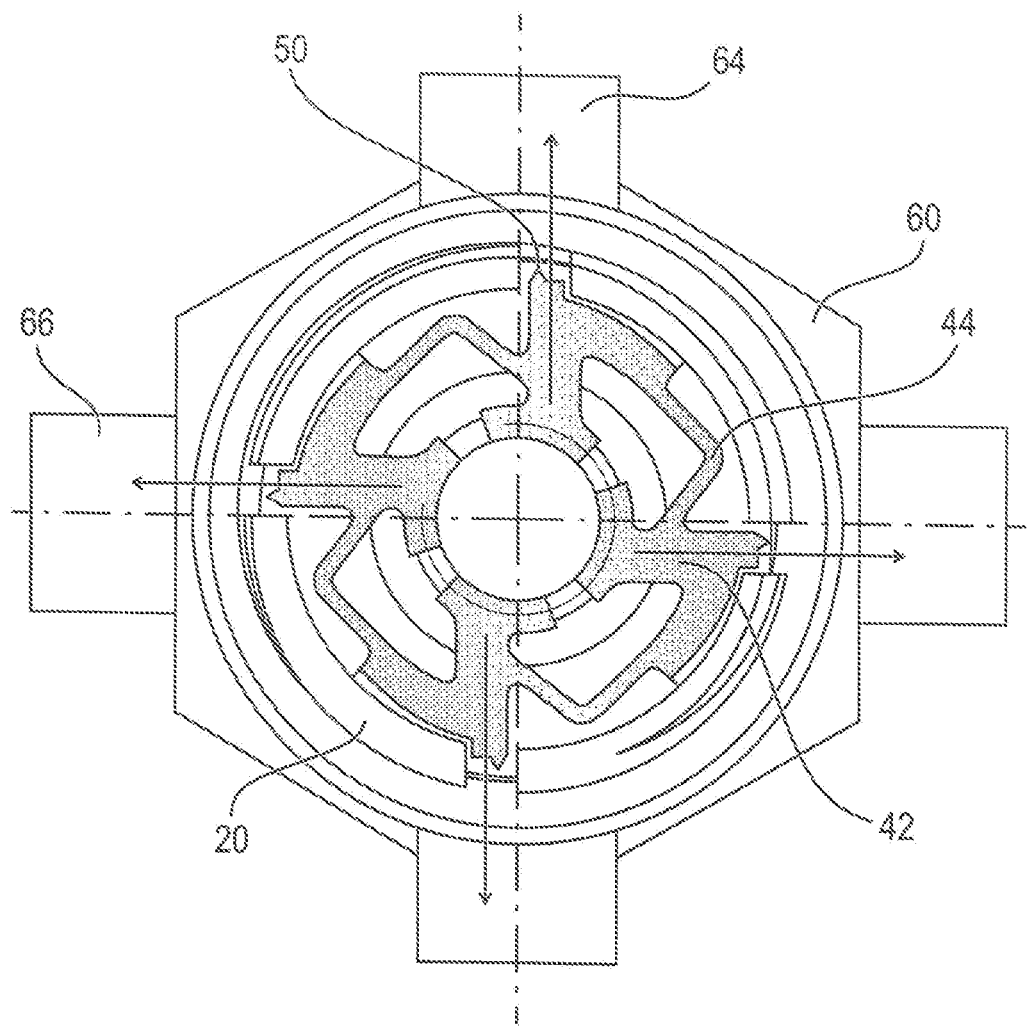
Figure 8:
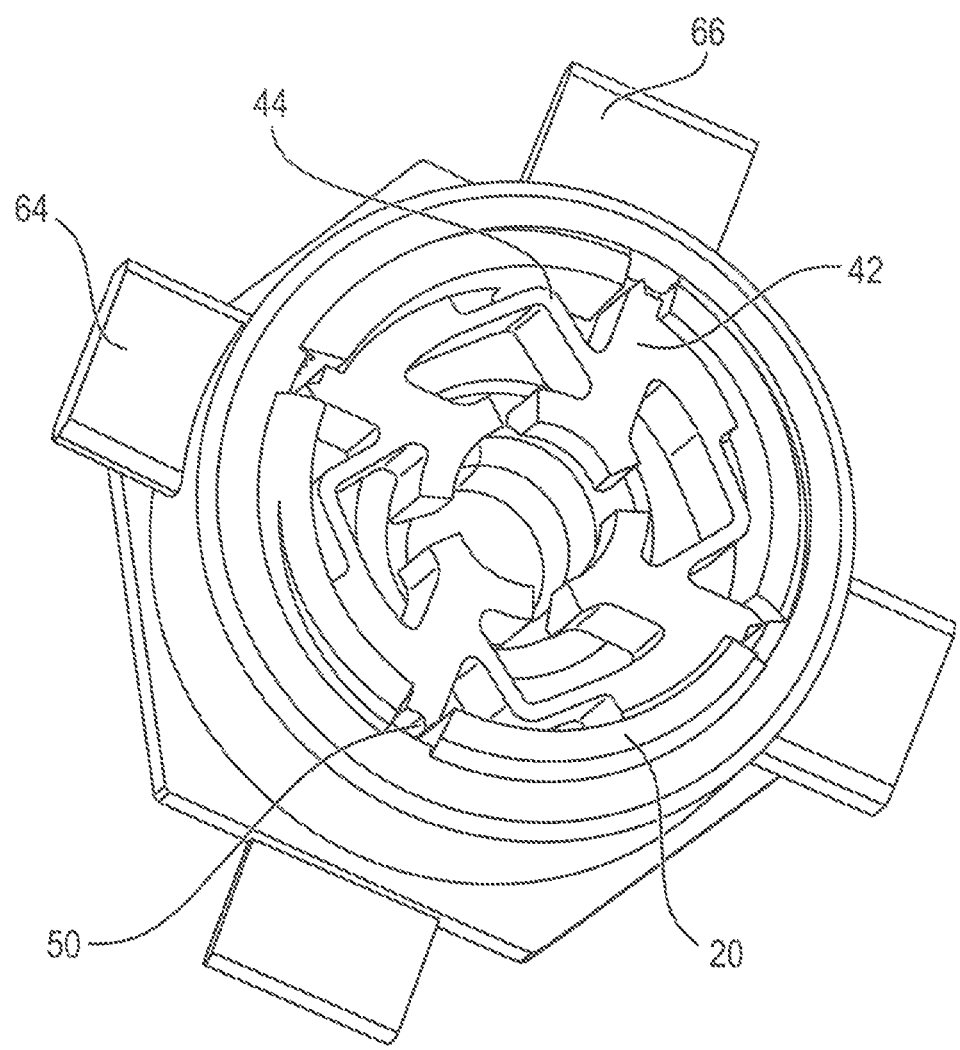
Figure 9:
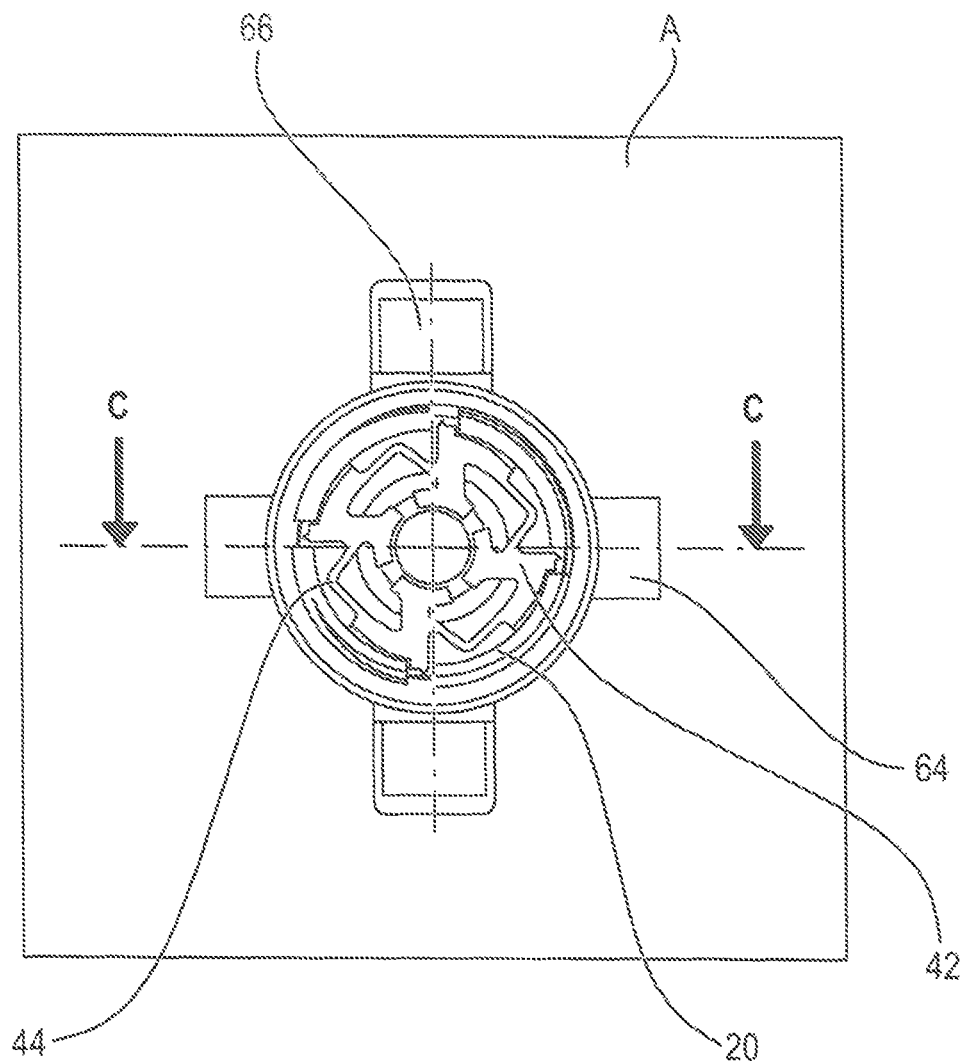
Figure 10:
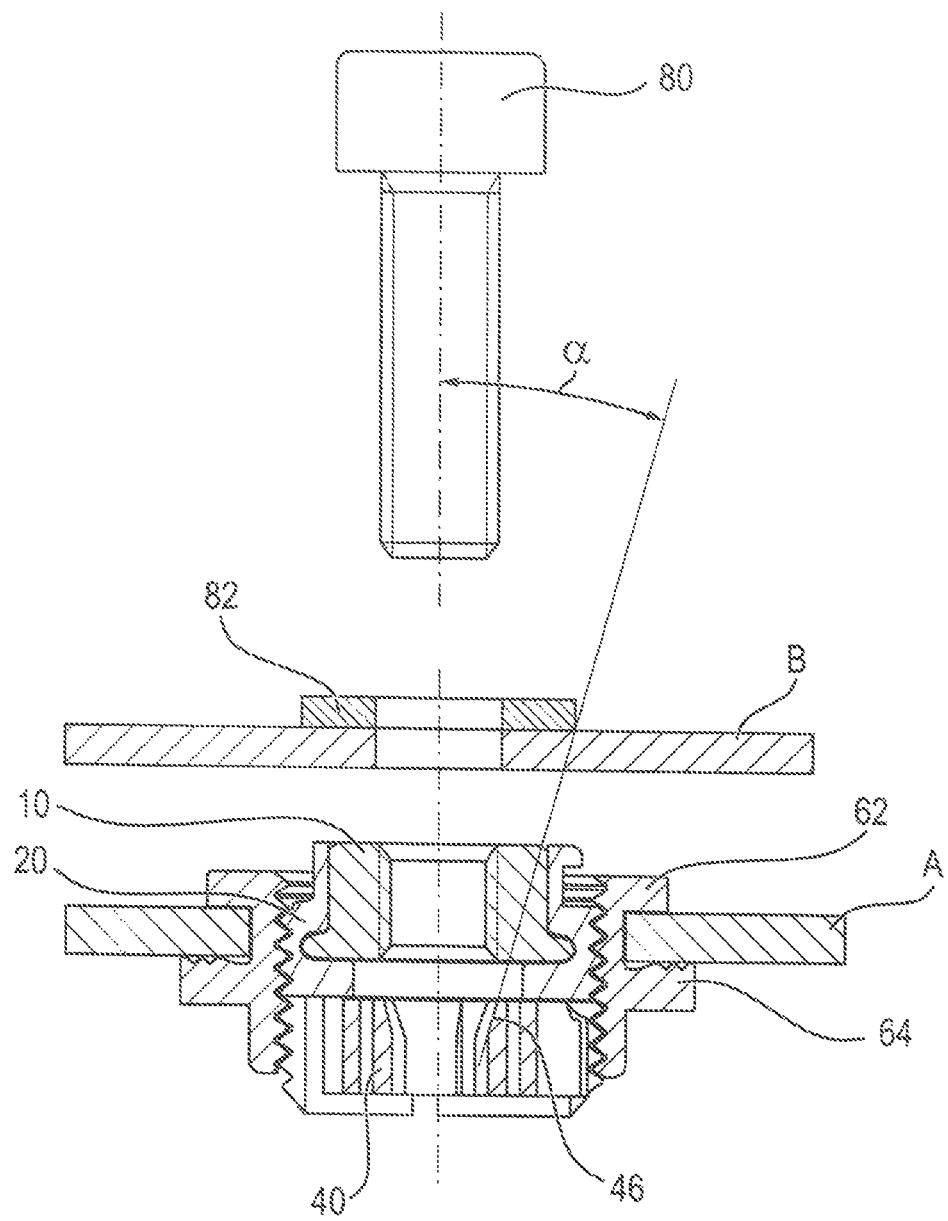
Figure 11:
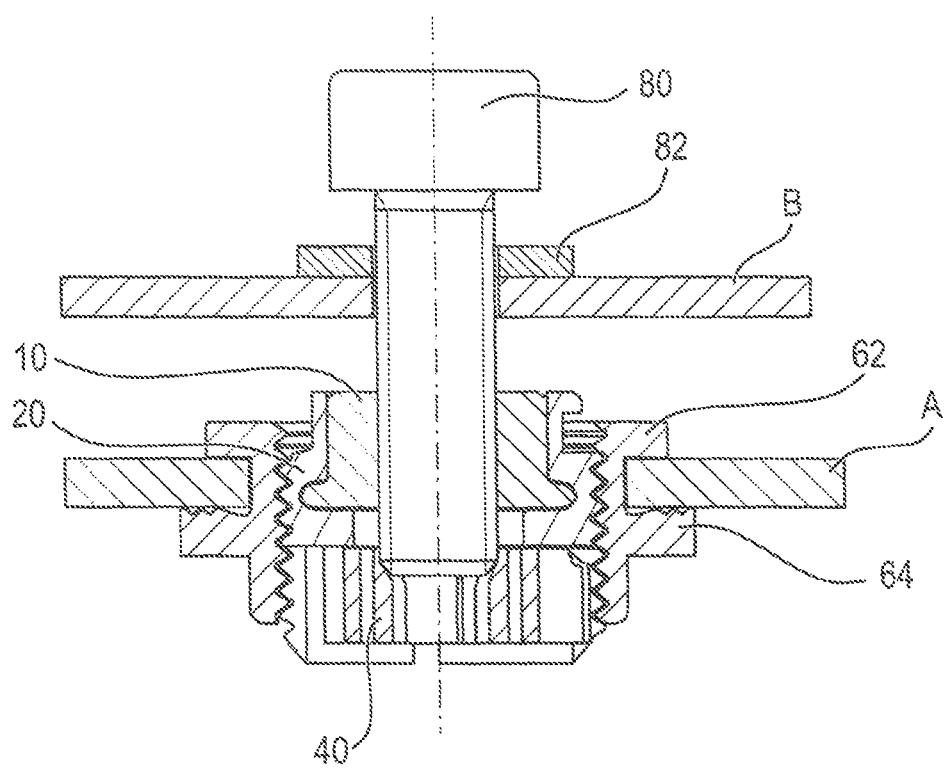
Figure 12:
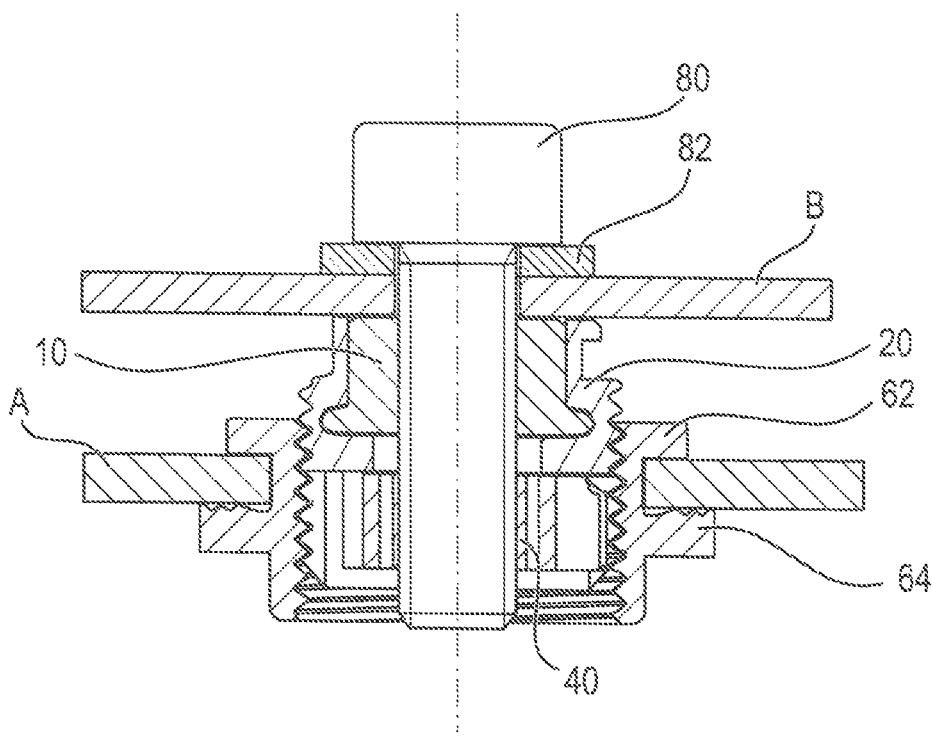
Figure 13:
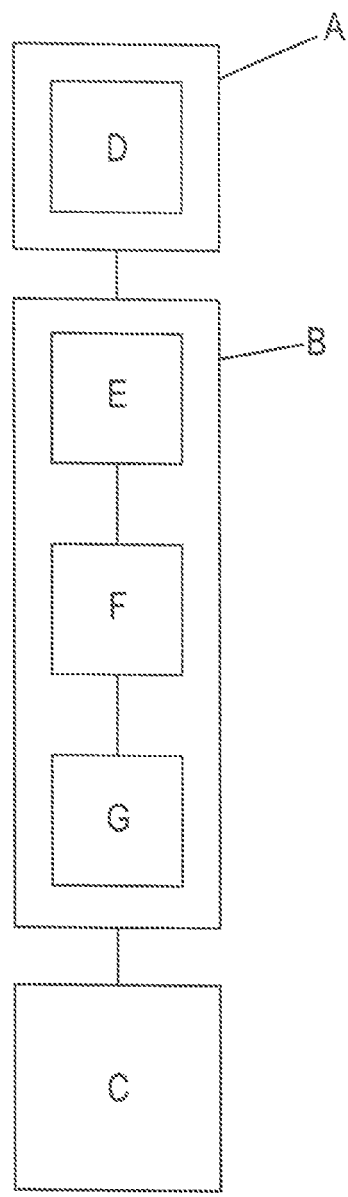
Figure 14:
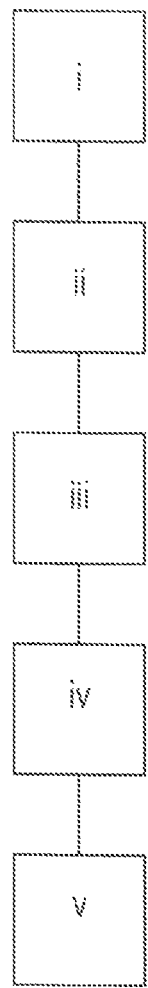

In the following, the present disclosure will be described in detail based on the drawings. In the drawings, the same reference signs denote the same components and/or elements. It shows:

FIG. 1 a perspective view of an embodiment of a tolerance compensation arrangement, FIG. 2 a perspective view of an embodiment of a fastening sleeve for an adjusting unit, FIG. 3 an exploded view of an embodiment of an adjusting unit with a dragging unit, FIG. 4 an exploded view of an embodiment of an adjusting unit with a dragging unit inserted therein and of a base element, FIG. 5 an exploded view of an embodiment of an adjusting unit with a dragging unit inserted therein and of a base element, FIG. 6 an exploded view of an embodiment of an adjusting unit, a dragging unit and a base element, FIG. 7 a bottom view of an embodiment of the tolerance compensation arrangement, FIG. 8 a perspective bottom view of an embodiment, of the tolerance compensation arrangement, FIG. 9 a bottom view of an embodiment of the tolerance compensation arrangement in a first component, FIG. 10 a sectional view of an embodiment of the tolerance compensation arrangement with a fastening screw that has not yet been screwed in, FIG. 11 a sectional view of an embodiment of the tolerance compensation arrangement with a fastening screw that has been screwed in, FIG. 12 a sectional view of an embodiment of the tolerance compensation arrangement with a fastening screw that has been screwed in tight, FIG. 13 a schematic course of the procedure of an embodiment of a manufacturing method, and FIG. 14 a schematic course of the procedure of an embodiment of an assembly method.

5. DETAILED DESCRIPTION

In the following, an embodiment of a tolerance compensation arrangement 1 is described in detail. The tolerance compensation arrangement 1 is an arrangement for fastening a first component to a second component with an automatic compensation of tolerances in the spacing between the first component and the second component.

With reference to FIG. 1, the tolerance compensation arrangement 1 comprises a base element 60 and an adjusting unit 20 with a fastening sleeve 10 arranged therein. The base element 60 has a cylindrical base body with a through hole and a first inner thread as well as a fastening structure at the radially outer side. It may be made of plastic material and has a flange 62 at a first axial end, the flange having a hexagonal shape, so that the flange 62 constitutes a drive feature for the base element 60, which can be seized with a common tool. Furthermore, there are two holding projections 64 that are arranged opposite to each other at the cylindrical base body, axially spaced with respect to the flange 62, whereas at the flange 62, there are two snap-in locking projections 66 at two opposite sides. The holding projections 64 and the snap-in locking projections 66 are arranged offset to each other, in the illustrated example by 90°. With regard to this construction of the base element with holding projections and snap-in locking projections, reference is also made to EP 2 003 346 A2.

In the following and with additional reference to FIGS. 2 to 8, the construction of the tolerance compensation arrangement 1 is described in more detail. For this purpose, FIG. 2 first of all shows a fastening sleeve 10 in form of a nut out of metal with a second inner thread and a flange 12. The fastening sleeve 10 is overmolded by the material of the adjusting unit 20 so that the first axial end of the fastening sleeve 10, i.e. the end without flange 12, is flush with the first axial end of the adjusting unit 20. In the later use, the second thread pairing is formed by the inner thread of the fastening sleeve and the outer thread of a fastening screw.

FIG. 3 shows the adjusting unit 20 having the shaped-in fastening sleeve 10 molded therein as well as a separate dragging unit 40. The adjusting unit 20 comprises a cylindrical base body, just as the base element 60, too. However, the adjusting unit 20 comprises a first outer thread which, together with the first inner thread of the base element 60, forms a first thread pairing of a first thread direction. It may be a thread pairing that is made of plastic material. Furthermore, the adjusting unit 20 has a radial projection 26 at the axial first end as a radially projecting structure, at which projection there is an axial projection 28 projecting into the direction of the second axial end of the adjusting unit 20. This axial projection 28 is formed such that it interacts with a recess 68 in the base element 60 in the screwed-in state of the adjusting unit 20 such, that a further screwing-in is prevented. Furthermore, a transport lock for the tolerance compensation arrangement is formed in this way. In particular, for guaranteeing this function, the radial projection 26 allows the axial projection 28 to lock into the recesses 68. Therefore, the radial projection 26 is configured such that the axial projection 28 can bounce in an axial direction.

Adjacent to the second axial end, the adjusting unit 20 comprises a first clearance or cut-out 22 in the cylindrical base body, the opening running in a circumferential direction, i.e. it is a radial cut-out. Furthermore, the adjusting unit 20 has a second cut-out 24 which runs in an axial direction. Accordingly, it is an axial cut-out.

The dragging unit 40 is also made of plastic material. In the illustrated embodiment, it comprises four circumferentially evenly spaced dragging segments 42 which are connected via connecting webs 44 with each other. The connecting webs 44 have a smaller thickness than the fastening segments 42.

Each fastening segment 42 has a chamfer 46 at the radial inner side at an end facing the fastening sleeve 10. The angle α of the chamfer 46 can be selected depending on the desired torque for screwing in the fastening screw. In this connection, the torque needed for screwing in the fastening screw into or through the dragging unit 40, respectively, is influenced, besides the angle α of the chamfer also by the thickness of the connecting webs. This will be described later on. In a further embodiment, the angle α of the chamfer relating to a longitudinal axis of the tolerance compensation arrangement 1 is an acute angle α, which is, in particular, selected from an angle range of 10° to 30°.

Furthermore, each fastening segment 42 comprises a locking notch 48 at the radial outer side. The locking notch 48 runs or extends circumferentially transversely to the longitudinal axis of the dragging unit 40 in the portion of the respective fastening segment 42. Furthermore, each fastening segment 42 comprises a guiding web 50 adjacent to the respective locking notch 48. The guiding web 50 runs parallel to the longitudinal axis of the dragging unit 40 and may be configured with sharp edges.

For the assembly, the dragging unit 40 is inserted into the adjusting unit 20 from the second axial end until the locking notches 48 lock into the first cut-out 22. In this connection, the guiding webs 50 run in the second cut-outs 24 and prevent a rotation of the dragging unit 40 during insertion. In this way, the dragging unit 40 is clipped into the adjusting unit 20 from the second axial end of the adjusting unit 20. The dragging unit 40 and the fastening sleeve 10 may be arranged with a distance to each other in the adjusting unit 20.

The adjusting unit 20 with the dragging unit 40 clipped therein is then screwed into the base element 60 until the axial projection 28 engages into the recess 68 of the base element 60.

With reference to FIGS. 9 to 12, the use of the tolerance compensation arrangement 1 is explained. First of all, the base element 60 with the screwed-in adjusting unit 20 is fastened in an opening of a first component A. For this purpose, the first component A comprises, for example, a key hole, so that the base element 60 can be fastened in the opening by insertion and rotation. Alternatively, it may be preferred when the base element 60 comprises an outer thread, locking notches or the like with which it can be fastened in or clipped into an opening of the first component A.

The second component B is now arranged at a distance to the first component A, so that an opening of the second component B is aligned with the tolerance compensation arrangement 1 in the first component A. Then, the fastening screw 80 is inserted through the opening in the second component B, wherein here, a flat washer 82 can be provided. The fastening screw 80 is now screwed into the fastening sleeve 10, until the fastening screw 80 encounters the chamfer 46 of the dragging unit 40.

In order to be able to further rotate the fastening screw 80, the fastening segments 42 of the dragging unit 40 must be pushed to the outside until the passage in the dragging unit 40 is approximately as big as the outer diameter of the fastening screw 80. For this purpose, the connecting webs 44 would have to bend correspondingly, for which a corresponding force is needed. At the current point in time, an application of this force is, however, not possible as the thread pairing between the adjusting unit 20 and the base element 60 is a smoothly running thread. Therefore, the adjusting unit 20 is screwed out of the base element 60 or dragged, respectively, until the adjusting unit 20 abuts the second component B.

Subsequently, the fastening screw 80 is further screwed in and now presses the fastening segments 42 to the outside by means of the angle of the chamfer 46. The force which may be necessary for that and thus the torque, too, can be adjusted via the angle of the chamfer 46 as well as the thickness of the connecting webs 44. The movement of the fastening segments 42 of the dragging unit 40 is transferred to the thread that is slitted or provided with the first and second cut-out, respectively, of the adjusting unit 20. In this connection, the tolerance compensation arrangement 1 may be configured such that, when the fastening screw 80 is located in the cylindrical part of the passage in the dragging unit 40 or when its thread is at least partially cutting into or grooving into the dragging unit 40, it is not only the play in the thread pairing between the adjusting unit 20 and the base element 60 that is eliminated, but also an additional pressing is generated due to oversize. The connection is now free of play and clamped against a loosening.

In order to achieve an additional security against loosening, the guiding webs 50 may be configured with sharp edges. Then, they grip or lock into the first inner thread of the base element 60. In addition or alternatively, the locking notches 48 can engage into the inner thread of the base element 60 when the fastening screw 80 is screwed in, thus further supporting the clamping.

A schematic course of procedure of an embodiment of a manufacturing method for a tolerance compensation arrangement is now described with reference to FIG. 13. In step A, the base element is provided with a first inner thread as well as with a fastening structure at the outside. In this connection, this step comprises injection-molding the base element out of plastic (step D).

Furthermore, an adjusting unit is provided in step B. The adjusting unit comprises a first outer thread and a fastening sleeve with a second inner thread which are arranged adjacent to a first axial end of the adjusting unit. Furthermore, a dragging unit is arranged at least partially in the adjusting unit adjacent to a second axial end of the adjusting unit. The adjusting unit and the dragging unit are therefore separate components. Step B can therefore be divided into several steps. In a step E, the fastening sleeve is therefore provided out of metal and is overmolded with a plastic material for manufacturing the adjusting unit. Alternatively to the overmolding, gluing the fastening sleeve into the adjusting unit, shrinking or clamping into the adjusting unit may be preferred. At the same time or at another point in time, a dragging unit is provided in step F, in particular by injection-molding a dragging unit. Finally, the dragging unit is clipped into the adjusting unit in step G.

As a last step, the assembly method in step C comprises screwing the adjusting unit into the base element, with the first outer thread together with the first inner thread forming a first thread pairing of a first thread direction.

A schematic course of procedure of an embodiment of an assembling method for two components at each other with a tolerance compensation arrangement is described in the following with respect to FIG. 14. Firstly, an insertion of the tolerance compensation arrangement into a first opening of a first component takes place in step i. The tolerance compensation arrangement comprises a base element having a first inner thread as well as a fastening structure at an outer side for fastening the base element in an opening of the first component, an adjusting unit that is screwed into the base element with a first outer thread, with the first outer thread together with the first inner thread of the base element forming a first thread pairing of a first thread direction and the adjusting unit comprising a fastening sleeve with a second inner thread adjacent to a first axial end, as well as a dragging unit being arranged at least partially in the adjusting unit adjacent to a second axial end. Then, in step ii, a second component is arranged with a distance to the first component with a tolerance compensation arrangement inserted therein. The inserting of a fastening screw through an opening in the second component and screwing in the fastening screw into the fastening sleeve takes place in step iii. For this purpose, the fastening screw has a second outer thread which, together with the second inner thread of the fastening sleeve, forms a second thread pairing of a second thread direction that is contrary to the first thread direction. The screwing in takes place by rotating the fastening screw in the second thread direction. Subsequently, the further rotation of the fastening screw takes place in step iv, until there is a frictional engagement of the fastening screw with the dragging unit, which causes the adjusting unit to move out of the base element into the direction of the second component until the adjusting unit, in particular the fastening sleeve, abuts the second component.

Finally, in step v, the further rotation of the fastening screw into the dragging unit takes place, in particular by overcoming the torque, which causes the adjusting unit to be clamped in the base element by the dragging unit.

The invention claimed is:

1. A tolerance compensation arrangement for fastening a first component to a second component with an automatic compensation of tolerances in the spacing between the first component and the second component, comprising the following features:
   a. a base element with a first inner thread as well as a fastening structure at an outside for fastening the base element in an opening of the first component,
   b. an adjusting unit with a first outer thread, with the first outer thread together with the first inner thread of the base element forming a first thread pairing of a first thread direction and the adjusting unit comprising a fastening sleeve with a second inner thread adjacent to a first axial end, and
   c. a dragging unit being arranged at least partially in the adjusting unit adjacent to a second axial end, while
   d. a fastening screw can first of all be screwed into the second inner thread of the fastening sleeve by rotating in the second thread direction via a second thread pairing of a second thread direction contrary to the first thread direction, and can subsequently be connected with the dragging unit by means of a releasable dragging connection, so that when rotating the fastening screw, the adjusting unit can be co-rotated and is movable in abutment to the second component and after that, a radial press fit between the adjusting unit and the base element can be caused.

2. The tolerance compensation arrangement according to claim 1, in which the first axial end with the attachment sleeve faces away from the base element and the second axial end of the adjusting unit with the dragging unit faces towards the base element.

3. The tolerance compensation arrangement according to claim 2, in which the connecting webs have a lower thickness than the dragging segments.

4. The tolerance compensation arrangement according to claim 1, in which the dragging unit comprises a plurality of dragging segments, which are circumferentially evenly spaced and connected via connecting webs.

5. The tolerance compensation arrangement according to claim 4, in which each of the dragging segments comprises a chamfer at the radial inner side at one of the ends which faces towards the attachment sleeve.

6. The tolerance compensation arrangement according to claim 4, in which each of the dragging segments includes a locking notch or a clamping web at the radial outer side, which interacts with a first cut-out of the adjusting unit.

7. The tolerance compensation arrangement according to claim 6, in which the locking notch or the clamping web is in direct contact with the base element after a fastening screw is screwed in.

8. The tolerance compensation arrangement according to claim 4, in which each of the dragging segments includes a guiding web adjacent to the locking notch at the radial outer side, the web interacting with a second cut-out of the adjusting unit.

9. The tolerance compensation arrangement according to claim 8, in which the guiding web is configured with sharp edges and is in direct contact with the base element after a fastening screw is screwed in.

10. The tolerance compensation arrangement according to claim 1, in which the adjusting unit consists of plastic material and the fastening sleeve of metal, with the fastening sleeve being overmolded by the material of the adjusting unit and a first axial end of the fastening sleeve being arranged flush with the first axial end of the adjusting unit.

11. The tolerance compensation arrangement according to claim 1, in which the dragging unit and the base element consist of plastic material.

12. The tolerance compensation arrangement according to claim 1, in which the dragging unit has four fastening segments.

13. The tolerance compensation arrangement according to claim 1, in which the adjusting unit has a structure adjacent to the first axial end which interacts with a recess in the base element, so that a counter lock and/or rotation lock is formed.

14. A first component in combination with a tolerance compensation arrangement according to claim 1, with the tolerance compensation arrangement being inserted into the first component.

15. A first and a second component which are fastened to each other via the tolerance compensation arrangement according to claim 1 and by means of a fastening screw.

* * * * *